United States Patent [19]

Novak

[11] 3,857,036
[45] Dec. 24, 1974

[54] ENCAPSULATED SCINTILLATION PHOSPHOR

[76] Inventor: William P. Novak, 15180 Lake Ave., Middlefield, Ohio 44062

[22] Filed: June 1, 1972

[21] Appl. No.: 258,521

[52] U.S. Cl.................. 250/367, 250/485, 250/486
[51] Int. Cl. ............................................. G01t 1/20
[58] Field of Search .......... 250/483, 486, 487, 485, 250/466, 367; 425/111, 112

[56] References Cited
UNITED STATES PATENTS

| | | | |
|---|---|---|---|
| 2,585,551 | 2/1952 | Hofstadter | 250/483 |
| 2,608,720 | 9/1952 | Meissner et al. | 425/111 |
| 3,023,313 | 2/1962 | LaMater et al. | 250/487 |
| 3,520,750 | 7/1970 | Li et al. | 425/112 |

Primary Examiner—James W. Lawrence
Assistant Examiner—Harold A. Dixon
Attorney, Agent, or Firm—Cain and Lobo

[57] ABSTRACT

An encapsulated scintillation phosphor wherein a thin foil reflector is fixedly disposed upon and encases all but one surface of the phosphor by means of a shrinkable thermoplastic synthetic resin which is shrink-fitted onto the foil-encased phosphor. The one surface not jacketed is that surface through which flashes of light generated within the phosphor, are monitored by a photomultiplier tube.

8 Claims, 5 Drawing Figures

PATENTED DEC 24 1974 3,857,036

ENCAPSULATED SCINTILLATION PHOSPHOR

BACKGROUND OF THE INVENTION

The use of scintillation phosphors, and particularly crystals, in which flashes of light are produced by the passage of charged particles through certain organic or inorganic crystalline materials, which flashes are then detected and amplified by a device such as a photomultiplier tube, is well known. Various types of probes utilize at least one scintillation crystal in light-communication with a photo-multiplier tube so as to quantify in some way, the flashes of light which result from fluorescent radiation emitted by atoms of the crystal as they return to their normal energy state after having been ionized or excited by a charged particle which enters the crystal lattice. In such application, namely, where the amount of light emitted is to be quantified, it is imperative that there be uniformity of light collected independent of scintillation site.

Though the scintillation counter has become a familiar instrument for the detection of many types of ionizing radiation in a wide variety of applications, more sophisticated utilization of scintillation phosphors has demanded an increasing attention to improvements in the physical requirements of the scintillation phosphors with respect to the way they are mounted in the instruments. The very advantages of the scintillation crystals, namely, high sensitivity to gamma rays, wide range of physical size, response proportional to the incident radiation, rapid response time, and a fast decay time, tend to be attenuated by the requirements of encapsulating the crystals for use under ordinary operating conditions. Despite the handicap of encapsulation, the excellent characteristics of scintillation crystals have made this type of detector useful in geophysical surveys for uranium and oil, clinical measurements of radio isotopes, radiation monitoring of personnel for exposure, as well as the many applications in nuclear physics and research.

Conventional techniques of encapsulating scintillation crystals include hermetically sealing a crystal in a metal case leaving a window on a surface of the crystal through which ionizing radiation is to enter it, and another window on another surface of the crystal through which light generated within the crystal is to be monitored. Conventionally, phosphors or scintillation phosphors are machined, sanded and polished according to known techniques to obtain the desired geometry. A conventional geometry is that of a cylindrical crystal; a reflector surface is provided around the cylindrical surface of the crystal and usually the surface through which phosphor-exciting radiation is to enter. Where a crystal is to be exposed to gamma radiation, the surface through which the gamma radiation is to enter is typically covered with aluminum foil. Another method for encapsulating the crystal includes nesting a crystal within a can and tightly packing the space between the metal can and the crystal with aluminum or magnesium oxide for the most effective reflection of light emanating from within the crystal. The surface of the crystal from which the light is to be monitored is usually hermetically sealed with a glass window. A more detailed description of the aforementioned methods may be found in "Alpha, Beta and Gamma Ray Spectroscopy", pages 283–284, Volume 1, edited by Siegbahn, North Holland Publishing, Amsterdam (1965).

It will be apparent that tightly packed gamma-ray-permeable oxides which provide the desired degree of reflectance is out of the question for scintillation crystals which are relatively small and which must be grouped together closely. It is also out of the question where the reflectance in each small crystal up to about 1 inch in diameter, must be precisely identical, since identical reflectance will not be obtained with packed reflector oxides. Specific instruments which require encapsulated scintillation phosphors are oil well scanners, gamma-ray cameras, probes for radioactive materials, and the like.

For use with gamma rays above 10 kilovolts, thin aluminum windows are used on machined and polished crystal surfaces encased in copper. Below 10 kilovolts, thin beryllium entrance windows are conventionally used with a cleaved crystal interface, as for example in conjunction with soft X-rays. Where the size of a crystal assembly permits, powdered oxide reflector is used between an aluminum reflector and the crystal. Where no powdered reflector oxide is used, despite efforts to maintain the aluminum reflector foil in close contact with the crystal, an irregular and relatively large spacing invariably exists so that, with a crystal surface in contact with a coupling fluid, capillary action permits wetting of the space to the detriment of maximizing light output. The aluminum foil used with gamma-radiation usually has a thickness of 0.005 to about 0.010 inch.

The function of mounted scintillation crystals is more easily stated than achieved mainly because the proper mounting of hygroscopic scintillation crystals is an art and a science in which the basic considerations for making lasting moisture-proof seals are combined with design and engineering skills to produce an efficient radiation detector. For lasting performance, a scintillation crystal must be hermetically sealed in such a way as to cope with problems of optimum optical design as well as practical mechanical considerations. Materials must be chosen so as to permit the desired radiation to pass through them into the crystal where desired, but should not add significantly to the radioactive background nor scatter significant amounts of radiation into the scintillator.

The main problems of packaging which effect resolution are discussed in "Applied Gamma-Ray Spectrometry", pages 62–64, edited by C. E. Crouthamel, Pergamon Press (1960) where he identifies the following problems: "optimizing the transfer of light from the scintillator to the photocathode, transmitting the desired radiation through the moisture-proof can, finding an easily fabricated moisture-proof seal for metal-to-metal and metal-to-glass joints, and maintaining the crystal surfaces and interfacial optical couplings in their original conditions." The difficulty of overcoming all these problems in small crystals is magnified.

The encapsulation technique as embodied in the encapsulated phosphors of the instant invention is applicable to inorganic crystals, organic crystals, plastic phosphors and contained liquid phosphors, and permits the ultimate in uniform availability of light generated within a small phosphor.

SUMMARY OF THE INVENTION

It has been discovered that a maximum amount of uniformly available light, emanating from within a scintillation crystal independent of the sites of incident radiation in a phosphor, may be monitored by a photomultiplier tube or the like by means of an encapsulated crystal which includes a foil-wrapped scintillation phosphor tightly jacketed by a heat-shrinkable thermoplastic synthetic resinous material which maintains the foil wrapping in close contact fixedly upon the crystal to provide specular reflections evenly throughout the mass of the crystal.

It has been discovered that a scintillation crystal jacketed in a heat-shrunk thermoplastic synthetic resinous material tightly encasing the crystal in a reflector disposed upon all but the monitoring surface of the scintillation crystal, provides a highly efficient means for collecting all the light emanating from within the crystal due to the impinging of light-emitting radiation within the crystal.

DETAILED DESCRIPTION OF THE INVENTION

It must be noted that crystals are packaged with techniques designed to overcome problems other than that of obtaining good resolution. For example, with thallium activated sodium iodide, NaI (Tl), it is imperative that the crystal be protected against moisture. Other crystals may be less moisture-sensitive but usually require relatively moisture-proof encapsulation. Large crystals, that is, those generally greater than 1 inch in diameter, are normally packaged in an aluminum can which, for gamma-ray spectrometry, is desirably of minimum mass. However, since it is known that the mere presence of a can around a crystal distorts, though very slightly, the pulse height spectrum by scattering photons into the crystal, Bell has developed foil packaging which has never acquired much favor in actual use. For particularly sensitive measurements utilizing small scintillator crystals, it is impractical to use an aluminum can, both from the point of view of physical convenience as well as because trace amounts of uranium and radium might be present in the aluminum. Use of aluminum foil minimizes this risk but entails the problem of encapsulating a foil-encased scintillator crystal with a jacket, permeable to ionizing radiation, which snugly holds the foil against the desired surfaces of the scintillator crystal.

Irrespective of the techniques used for encapsulation, and regardless of the size of the crystal to be packaged, it is well known that the finished scintillation crystal must be protected against contamination during all steps of packaging. This is often done in the laboratory using SARAN WRAP or similar plastic around the scintillation crystal as a disposable cover. In another application, aluminum foil is wrapped around a light pipe and adhesive cellophane tape is used to keep the foil in place around the light pipe. Neither application contemplates the use of plastic shrink-fitted around an aluminum foil-encased relatively small scintillation crystal, a technique which unexpectedly provides a simple and effective means for overcoming the problems mentioned hereinabove. This is particularly demonstrated with regard to clustered crystals of high sensitivity from which light must be collected essentially uniformly, independent of the scintillator site, in a radiation-detecting instrument.

Figure 1:
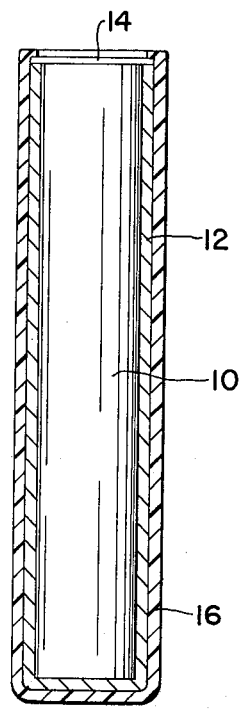
FIG. 1 is an enlarged side elevational sectional view of an encapsulated scintillation crystal in accordance with this invention.

Referring now to FIG. 1 of the instant invention wherein a small cylindrical scintillation crystal having a diameter of about 0.125 inch and a length of about 0.625 inch is shown in enlarged partial cross section, a thallium doped cesium iodide crystal, CsI (Tl), 10, is encased in a highly reflective aluminum foil 12 disposed about the cylindrical surface of the crystal and the end exposed to ionizing radiation, such as gamma rays. The dimensions of the crystal and the material are chosen with respect to the energy and type of radiation to be monitored. The CsI (Tl) crystals described are useful for gamma radiation having an energy in the range from 100 to 400 kev. The other end of the crystal is provided with a window 14 of a suitable optically plane material in light transmitting fluid contact with the crystal 10 as is well known in the art. A tubular jacket 16, closed at one end, of a shrinkable thermoplastic synthetic resin is slidably disposed upon the crystal, the open end of the tubular jacket slightly overhanging the window 14. A suitable resin is a heat-shrinkable polyolefin preferably a halogenated polyolefin such as polyvinyl chloride or polytetrafluoroethylene. The assembly is subjected to heat at a sufficiently high temperature and for a sufficient period of time to provide a shrink-fit of the tubular jacket over the crystal and the periphery of the window. The heat-shrunk tubular jacket 16 tightly presses the reflective aluminum foil against the surface of the crystal; the end of the tubular jacket 16, shrunk over the periphery of the window 14, presses the window against the face of the crystal. Where a crystal, as described in this particular embodiment and shown in FIG. 1, is to be coupled to the input window of a photomultiplier tube, it is advisable to use a coupling fluid to fill the space between the outer surface of the window and the input window of a photomultiplier tube. It will be recognized that by utilizing relatively thin jackets, the space between the outer surface of the window and the input window may be minimized.

Figure 2:
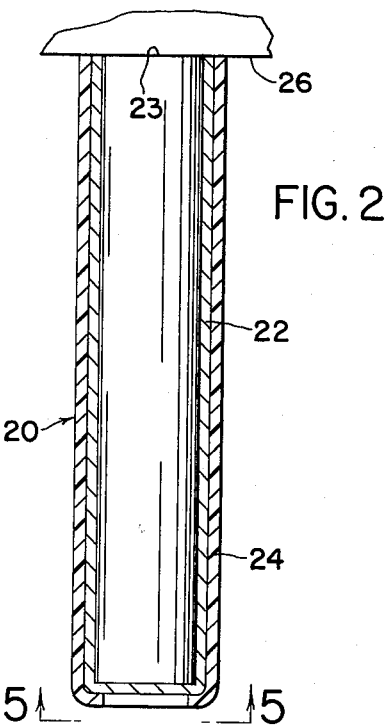
FIG. 2 is an enlarged side elevational view in cross section showing another embodiment of the invention.
Figure 5:
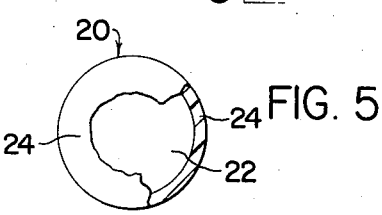
FIG. 5 is an enlarged end view of a scintillation crystal encapsulated by a thermoplastic synthetic resinous tube open at both ends, the end shown being partially broken away.

Where, for example, a crystal is to be directly coupled to a photomultiplier tube of a radiation detecting instrument as, for example, in a gamma-ray camera or oil-well-logging detector head, a similar scintillation crystal may be encapsulated as illustrated in FIG. 2. The crystal 20 is encased in an aluminum foil 22 having a thickness of about 0.005 inch, the foil covering all surfaces except the surface 23 through which light flashes within the crystal are to be monitored. The foil-encased crystal is then slidably jacketed with a tube 24 open at both ends, the diameter of the tube being so chosen as to maintain the relative position of the tube and the foil-encased crystal, and the length is so chosen as to be slightly longer than the crystal, overhanging one end. The other end of the crystal through which light flashes are to be monitored is coplanarly disposed with one end of the tube. As in the embodiment described in FIG. 1 hereinabove, a heat-shrinkable, optionally halogenated polyolefin and, more particularly, heat-shrinkable polyvinyl chloride or polytetrafluoroethylene are preferred materials for the tube 24. The assembly is subjected to heat at a sufficiently high temperature and for a sufficient period of time to provide a shrink-fit of the tube 24 over the crystal and that end of the crystal which is foil-encased. The overhang of the tube 24 is so chosen as to provide a constricting force upon a sufficient portion of the foil-encased end of the crystal as to maintain the foil-wrapping tightly disposed thereupon. An enlarged end view of that end of the encapsulated foil-encased scintillation crystal, permeable to ionizing radiation upon exposure thereto, is diagrammatically illustrated in FIG. 5, where the numerals have the same connotation as those in FIG. 2. The other end of the crystal surface through which the light flashes are to be monitored, may be directly coupled, optionally with a film of coupling fluid to the input window of a photomultiplier tube 26 (a fragment of which is diagrammatically illustrated in FIG. 2).

Figure 3:
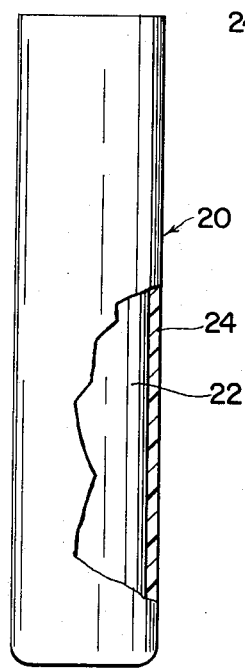
FIG. 3 is an enlarged side elevational view of FIG. 2 in partial section, with a portion of the thermoplastic synthetic resinous material broken away.

FIG. 3 is an elevational view in partial section showing the jacket 24 partly broken away exposing the reflector foil 22 snugly wrapping the cylindrical surface of the crystal as well as the lower end surface (not visible in this view).

Figure 4:
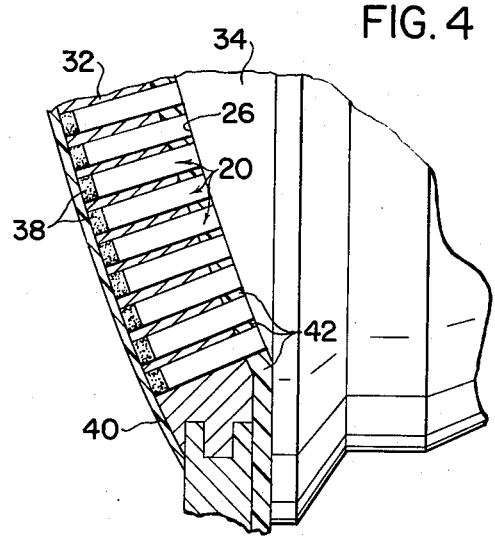
FIG. 4 is a partial cross section, with parts broken away, in side elevation view, of the head of a gamma-ray camera.

FIG. 4 is a partial cross section view, greatly enlarged, of a portion of the head of a gamma-ray camera showing a cluster of jacketed scintillation crystals 20 closely clustered in a scintillation crystal matrix 32 made of a gamma-ray-impermeable material such as lead. The ends of the crystals through which light flashes are to be monitored by an image intensifier tube 34 are in abutting contact with the input window, the surface 26 of which may be coated with a coupling fluid. The other end of each of the foil-encased jacketed crystals is biased against an ionizing-radiation-permeable pad 38 pressingly disposed against the surface of a plastic shield 40 which covers the exterior surface of the scintillation crystal matrix 32. The scintillator crystals within the crystal mosaic are preferably spaced in a hexagonal pattern, with a center to center distance of 0.1875 inch. It will be apparent that the jacketed foil-encased crystals of the instant invention are ideally adapted to such close spacing. Coupling fluid 42 surrounds crystals 20 above the crystal matrix 32.

Scintillation crystals useful as relatively small ionizing radiation detectors include the doped inorganic salts of the halides of elements of Groups 1 and 2 of the Periodic Table and particularly the following: thallium-activated sodium iodide, europium-activated lithium iodide, thallium-activated cesium iodide, sodium-activated cesium iodide, and thallium activated potassium iodide.

Other aluminum foil-encased crystals which may be conveniently jacketed with a shrink-fitted plastic jacket include organic crystals of anthracene, stilbene and polyvinyl toluene. The organic crystals provide fast response and are particularly useful for low intensity radiation. Foil wrapping having a thickness of from about 0.005 to about 0.001 inch is used on aluminum scintillator crystals specifically used for the detection of beta radiation of soft X radiation. Other materials which may be used as foil for encasing a crystal include silver, gold and aluminized plastic films, the choice of materials devolving in large measure upon the energy of radiation to be monitored, size and shape of the crystal, and the economics. For example, silver foil is easily attacked both by oxygen as well as by several crystal materials; gold is chemically resistant but is relatively dense; aluminized Mylar is generally not sufficiently opaque.

Irrespective of the type of material from which the reflective foil is made, the smooth foil is pressed against the surface of the crystal by the shrunk plastic jacket and is in point-to-point contact with that surface at a multiplicity of locations; thus, an extremely small air gap between the crystal surface and foil is provided. This air gap effectively maximizes the light output of the crystal. Maximum light output is obtained as long as the air gap is greater than one wave length of the light generated within the crystal. Particularly where an end surface of the crystal is in contact with a photomultiplier tube or an image intensifier tube using a coupling fluid as described hereinbefore and illustrated in FIG. 4, it is essential that the gap between the reflective foil and the surface of the crystal around which the foil is disposed, be free from wetting. If fluid enters the gap and wets the surface of the crystal and the contiguous foil surface, the output of light is diminished. It will be noted that despite the apparent smoothness of the crystal surfaces and the surface of the reflective foil, the surfaces are not smooth with respect to a wave-length of light generated within the crystal.

Where a scintillation counter is formed of a liquid organic material, it may be contained in a capsule of ionizing radiation permeable material which, in turn, is foil-wrapped and subsequently encapsulated in a shrink-fitted plastic jacket. As explained hereinabove, an air gap greater than a wave-length of light generated within the crystal is established between the surface of the capsule and the contiguous foil surface in which the capsule is wrapped.

The thermoplastic synthetic resinous materials most preferred are heat-shrinkable polyvinyl chloride and polytetrafluoroethylene, commonly sold under the trademark Teflon. The thickness of the jacket is not critical except that it must be permeable to the ionizing radiation to be monitored. A preferred thickness of the tubular plastic material is in the range from about 0.005 to about 0.020 inch. The color of the plastic material and its permeability to visible light is immaterial except where aluminized Mylar is used which is not essentially opaque in which case, the heat-shrunk resin jacket is preferably opaque. Cold shrinkable synthetic resinous materials may also be used.

The invention is not restricted to the slavish imitation of each and every one of the details described above, which have been set forth merely by way of example with the intent of most clearly setting forth the teaching of the invention. Obviously, devices may be provided which change, eliminate, or add certain specific details without departing from the invention.

I claim:

1. An encapsulated radiation detector comprising a shaped scintillation phosphor sensitive to ionizing radiation so as to emit flashes of light upon impingement of said radiation within said phosphor, a reflective foil to provide specular reflection on all surfaces of said crystal except a surface through which said flashes of light are to be essentially, uniformly collected independent of scintillation site, said foil being fixedly disposed upon said surface by means of a shrink-fitted jacket provided by a thermoplastic synthetic resinous material permeable to said ionizing radiation, disposed upon said foil.

2. A scintillation crystal consisting essentially of a shaped inorganic crystal encased in a reflective foil on all surfaces of said crystal except that surface through which light emanating within said crystal as a result of impingement of light-producing radiation is to be monitored, said reflective foil being fixedly disposed upon said surfaces by means of a thermoplastic synthetic resinous material heat-shrunk upon said surfaces to fixedly maintain said reflective foil in maximum specular-reflecting relationship upon said crystal.

3. A cylindrical scintillation crystal one end of which is open to gamma-ray radiation capable of generating visible light within said crystal, said visible light to be monitored through the other end, said crystal being shielded from radiation about its cylindrical surface, a visible light reflective gamma-ray-permeable foil disposed on said open end and said cylindrical surface, said foil maintained in fixed relationship thereupon by means of a heat shrunk gamma-ray-permeable thermoplastic synthetic resinous material tightly encasing said crystal with said foil at the same time maintaining said other end in visible light communication with means for quantifying said light.

4. The article of claim 3 wherein said heat shrunk thermoplastic synthetic resinous material is a halogenated polyolefin.

5. The article of claim 4 wherein the halogenated polyolefin is polytetrafluoroethylene.

6. A crystal of claim 3 wherein said reflective coating is provided by a foil of reflective metal having a thickness in the range from 0.1 to 100 mils.

7. A crystal of claim 6 wherein said reflective coating is aluminum foil.

8. In a measuring device for monitoring gamma rays impinging upon plural scintillation crystals or phosphors proximately disposed relative to each other, the surfaces of said crystals being shielded from gamma rays on all surfaces except a gamma-ray-permeable surface, the other surface being in visible light communication for monitoring of light emanating within said crystal by means of a photo multiplier tube, the improvement consisting of a reflective foil disposed upon all said surfaces, said foil maintained fixedly upon said surface by a heat shrunk gamma-ray-permeable thermoplastic synthetic resinous material.

* * * * *